Sept. 2, 1924.

N. A. NELSON

LAWN MOWER SHARPENING DEVICE

Filed May 2, 1923

1,507,248

INVENTOR.
NELS A. NELSON.
BY HIS ATTORNEY.

Patented Sept. 2, 1924.

1,507,248

UNITED STATES PATENT OFFICE.

NELS A. NELSON, OF MINNEAPOLIS, MINNESOTA.

LAWN-MOWER-SHARPENING DEVICE.

Application filed May 2, 1923. Serial No. 636,132.

*To all whom it may concern:*

Be it known that I, NELS A. NELSON, a citizen of the United States, residing at Minneapolis, in the county of Hennepin and State of Minnesota, have invented certain new and useful Improvements in Lawn-Mower-Sharpening Devices; and I do hereby declare the following to be a full, clear, and exact description of the invention, such as will enable others skilled in the art to which it appertains to make and use the same.

This invention relates to a device for sharpening lawn mowers and is in the nature of an attachment for the standard lawn mower which may readily be placed thereon or removed therefrom. As is well known, the ordinary form of lawn mower has a revolving head carrying spaced cutting blades extending parallel to the axis of said head. These blades revolve in close proximity to a cutter bar so that the grass is severed by a shearing action between said blades and the cutter bar. The blades of the cutter head often become dull and it is quite an expensive and inconvenient matter to remove the cutter head and have the blades thereof sharpened at a sharpening establishment.

It is an object of this invention to provide an extremely simple and efficient device which may be placed on the cutter bar of a lawn mower without removing the bar or the cutter head and which will act to sharpen the blades of the cutter head.

It is a further object of the invention to provide such a device comprising a narrow bar or strip of material having on one flat side thereof an abrasive surface adapted to act on the cutter blades, which bar or strip has spaced means engaging the cutter bar for holding the strip thereon.

It is still another object of the invention to provide such a bar or strip of material adapted to be placed on the cutter bar which, preferably is of wedge shape form and has adjacent one edge thereof yielding means engaging the cutter bar for supporting said strip.

These and other objects and advantages of the invention will be fully set forth from the following description made in connection with the accompanying drawings in which like reference characters refer to the same parts throughout the different views and in which, Fig. 1 is a vertical transverse section through the cutter head and cutter bar of a lawn mower showing the device of the invention applied thereto;

Figure 1:
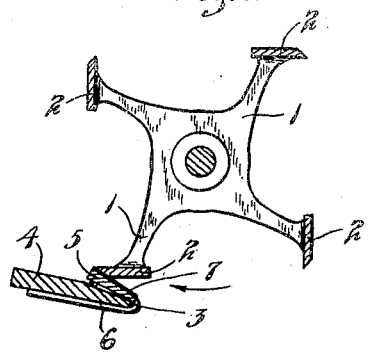
Figure 2:
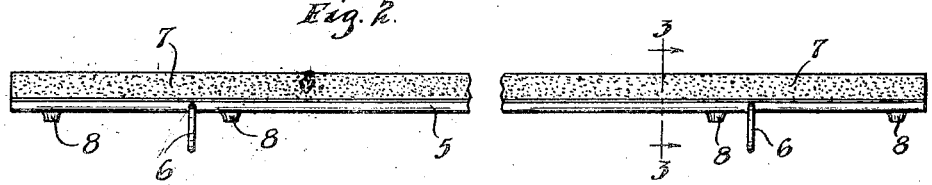
Fig. 2 is a view in front elevation of the device detached from the mower.

Referring to the drawings, particularly Fig. 1, the revolving cutter head frame of the lawn mower of standard type is shown as 1 having outwardly projecting arms to which are secured the cutter blades 2. These blades are usually provided with beveled and sharpened edges which revolve in close proximity to the edge or corner 3 of a cutter bar 4 which is carried on the frame of the lawn mower. The direction of rotation of the cutter head relatively to the cutter bar is indicated by the arrows in Fig. 1. The sharpening device of this invention comprises a strip or bar of wood, metal, or other suitable material 5. In the embodiment of the invention illustrated, said strip 5 is shown as being wedge shaped in cross section or of greater thickness at one edge than the other. The said strip has staple or hook-like members 6 secured therein, preferably made of wire or rod-like material and projecting from the narrower edge thereof and bent reversely to extend at a somewhat acute angle to the flat surface of said strip. One flat surface of the strip is provided with an abrading surface 7. This surface may be formed by gluing or otherwise firmly securing a layer of emery or carborundum cloth to the flat surface of the bar or the surface may be formed on the bar by powdered emery or carborundum cemented thereto in any suitable manner. The side of the strip 5 opposite that having the abrading surface thereon is provided adjacent one edge with projecting frusto-conical members 8 which, preferably, will be formed of comparatively soft rubber so as to be yielding and resilient.

Figure 3:
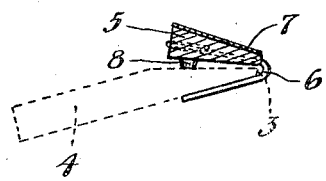
Fig. 3 is a view in vertical section taken on the line 3—3 of Fig. 2, as indicated by the arrows, shown on an enlarged scale, the cutter bar being shown therein in dotted lines.

When the blades of the lawn mower have become dull and need sharpening, the cutter bar 4 will be loosened on the frame of the lawn mower and the strip 5 applied thereto, as indicated in Fig. 1. The cutter bar is generally of cross section indicated in Figs. 1 and 3 and the member 6 will extend under the cutter bar and hold the member 5 securely in engagement with the upper surface thereof, the strip 5 being supported against one edge by the members 8 which will contact the surface of the cutter bar. The cutter bar is now fixed in position so that the blades 2 can revolve and come into suitable contact with the abrading surface 7. When the cutter bar is secured in this position the lawn mower can be traversed along a walk or any other surface and the cutting portion of the blades 2 repeatedly engaging the abrading surface 7 will effectively and efficiently be sharpened. After the desired sharpening of the blades 2 has been effected the strip can readily be removed by simply pulling the same off the cutter bar and the cutter bar will then again be adjusted in suitable relation to the cutter blades 2. While the strip 5 is on the cutter bar in position to be engaged by the other blades 2, the same will yieldingly be supported by the members 8 so that the strip 5 will have a slight yielding action and the abrading surface 7 will thus not be injured by the revolving blades 2.

From the above description it is seen that applicant has invented an extremely simple and efficient attachment to be placed on a lawn mower for sharpening the same. The attachment can be made and marketed at trifling cost and will result in a great saving to users of lawn mowers as the lawn mower can be sharpened several times with one of the attachments before renewing the abrading surface and the cost of the attachment will be much less than the amount usually charged by a sharpening establishment for one sharpening of the lawn mower. The parts of the device are quite few and the same is easily and conveniently made. While in practice the device has been found to be very efficient with the strip 5 made of wood, it will be apparent that said strip could be made of metal or any other desired material.

It should be noted that the strip 5 will be in contact with the cutter bar throughout the length of the same while said bar is in position on the lawn mower. The blades 2 will thus be sharpened in proper relation to the cutter bar so that when the blades again co-operate with said bar they will have the correct position relative thereto throughout the length of the same. This is a decided advantage in sharpening over the method in which the cutter head is removed from the lawn mower. After the cutter head is sharpened, it is very difficult to have the blades pass in proper relation to the cutter bar when the cutter head is replaced in the lawn mower frame.

It will, of course, be understood, that various changes may be made in the form, details and proportions of the device without departing from the scope of applicant's invention, which, generally stated, consists in a device capable of carrying out the objects above enumerated and such as shown and described and set forth in the appended claims.

What is claimed is:

1. A sharpening attachment for the cutters on the revoluble cutter head of a lawn mower comprising a strip of material having spaced means disposed transversely thereof adapted to hook over the forward edge of the cutter bar of the lawn mower and seat thereon at its forward edge, resilient means engaging said cutter bar and supporting the rear portion of said strip, the top surface of said strip being formed of abrasive material and disposed in a plane intersecting the path of movement of the cutters.

2. A sharpening attachment for the cutters on the revolving cutter head of a lawn mower comprising a wedge-shaped strip of material having spaced hook-shaped clips extending transversely thereof adapted to hook over the forward edge of the cutter bar and engaging said bar with its lower forward edge, spaced resilient pads on said strip adjacent its rear edge and adapted to seat on the cutter bar, the upper surface of said strip being formed of abrasive material and disposed in a plane intersecting the path of said cutters.

In testimony whereof I affix my signature.

NELS A. NELSON.